(12) United States Patent
Chung et al.

(10) Patent No.: US 9,685,075 B2
(45) Date of Patent: Jun. 20, 2017

(54) DATA COMMUNICATION SYSTEMS AND METHODS AND DEVICES FOR DATA COMMUNICATION BETWEEN ELECTRONIC DEVICE WITH SERIAL DATA OUTPUT AND CLIENT DEVICE WITH AUDIO PORT

(71) Applicant: H2 Inc., George Town, Grand Cayman (KY)

(72) Inventors: Wen-Chun Chung, Taipei (TW); Chu-Yie Deng, Taipei (TW)

(73) Assignee: H2 INC., George Town, Grand Cayman (KY)

( * ) Notice: Subject to any disclaimer, the term of this patent is extended or adjusted under 35 U.S.C. 154(b) by 258 days.

(21) Appl. No.: 14/107,207

(22) Filed: Dec. 16, 2013

(65) Prior Publication Data

US 2014/0368355 A1 Dec. 18, 2014

Related U.S. Application Data

(60) Provisional application No. 61/835,019, filed on Jun. 14, 2013.

(51) Int. Cl.
*G08C 23/02* (2006.01)
*G06F 13/38* (2006.01)

(52) U.S. Cl.
CPC ............ *G08C 23/02* (2013.01); *G06F 13/385* (2013.01)

(58) Field of Classification Search
CPC ....... G06F 13/385; G06F 21/10; G08C 23/02; G10L 13/00; A61B 5/7465
See application file for complete search history.

(56) References Cited

U.S. PATENT DOCUMENTS 6,065,075 A * 5/2000 Ryzin .................. G06F 13/4068
710/65
7,648,463 B1 1/2010 Elhag et al.
(Continued)

FOREIGN PATENT DOCUMENTS

CN 102457598 5/2012
CN 102457788 5/2012
(Continued)

OTHER PUBLICATIONS

European Search Report dated Nov. 20, 2014.
(Continued)

*Primary Examiner* — Sisay Yacob
(74) *Attorney, Agent, or Firm* — McClure, Qualey & Rodack, LLP

(57) ABSTRACT

A data communication system including an electronic device including a serial port, a client device including at least an audio port and an interface device is provided. The electronic device is configured to obtain serial data and output the serial data via the serial port. The interface device is coupled between the electronic device and the client device and includes a serial port connected to the serial port of the electronic device, a signal conversion device and an audio port connected to the audio port of the client device, wherein the interface device receives first serial data from the electronic device via the serial port, converts the received first serial data to first audio signals via the signal conversion device, and outputs the first audio signals to the client device via the audio port, such that the client device obtains the serial data according to the first audio signals.

16 Claims, 5 Drawing Sheets

(56) References Cited

U.S. PATENT DOCUMENTS

| | | | |
|---|---|---|---|
| 8,280,009 B2* | 10/2012 | Stepanian | G06F 21/10 |
| | | | 348/14.04 |
| 8,639,278 B1* | 1/2014 | Samios | H04W 76/005 |
| | | | 455/422.1 |
| 2010/0117835 A1 | 5/2010 | Nanikashvili | |
| 2010/0215183 A1 | 8/2010 | Hansson et al. | |
| 2010/0292556 A1* | 11/2010 | Golden | A61B 5/7465 |
| | | | 600/364 |
| 2010/0318694 A1* | 12/2010 | Wu | G06F 13/385 |
| | | | 710/63 |
| 2011/0099298 A1 | 4/2011 | Chadbourne et al. | |
| 2012/0108230 A1* | 5/2012 | Stepanian | G06F 21/10 |
| | | | 455/422.1 |
| 2012/0116184 A1 | 5/2012 | Shieh | |
| 2012/0136218 A1* | 5/2012 | Lee | G06F 19/3418 |
| | | | 600/300 |
| 2012/0156933 A1* | 6/2012 | Kreger | A61B 5/02433 |
| | | | 439/625 |
| 2012/0252367 A1* | 10/2012 | Gaglio | G10L 13/00 |
| | | | 455/66.1 |
| 2016/0095554 A1 | 4/2016 | Shieh | |

FOREIGN PATENT DOCUMENTS

| | | |
|---|---|---|
| CN | 203351913 | 12/2013 |
| EP | 2 487 931 A2 | 8/2012 |
| WO | WO 2012/015524 | 11/2012 |

OTHER PUBLICATIONS

European Office Action dated Jan. 29, 2016, issued in application No. 14 172 425.2-1954.

Chinese language office action dated Oct. 8, 2016, issued in application No. CN 201410264446.5.

Notice of Oral Proceedings dated Feb, 21, 2017, issued in application No. 14172425.2-1954/2813951.

* cited by examiner

DATA COMMUNICATION SYSTEMS AND METHODS AND DEVICES FOR DATA COMMUNICATION BETWEEN ELECTRONIC DEVICE WITH SERIAL DATA OUTPUT AND CLIENT DEVICE WITH AUDIO PORT

CROSS REFERENCE TO RELATED APPLICATIONS

This application claims the benefit of U.S. Provisional Application No. 61/835,019, filed Jun. 14, 2013, the entirety of which is incorporated by reference herein.

BACKGROUND OF THE INVENTION

Field of the Invention

The disclosure relates generally to data communication systems and methods, and, more particularly to data communication systems and related methods and devices for data communication between electronic devices with serial data output and client devices with an audio port.

Description of the Related Art

Electronic devices such as medical devices and health-related monitoring devices with sensors and detectors (e.g. a pulse oximeter, a ventilator, an EKG device, or other health-related monitoring devices) are widely used for collecting or measuring medical and health index data such as Blood Glucose level, Blood Pressure, EKG, Cholesterol, Uric Acid and other vital information. Each one of these devices may produce its own set of data with its own format that must be compiled and analyzed and the measured data may be read and displayed on its display screen only. In order to record all of this vital information for further processing, the electronic devices need to communicate with a client device such as a computer system. Generally, the electronic devices may communicate with a client device through a serial port such as a RS-232 port, wherein each of the electronic devices may have a serial port to connect to the client device with the serial port and output its own set of data in a serial data form to the client device via the serial port. However, the client device may not be able to communicate with the various electronic devices because the client device's communication protocol may differ from that of the electronic device and some devices may not have a serial port corresponding to that of the electronic devices to connect to the electronic devices.

Therefore, a need exists for a system where an electronic device such as a medical device can communicate with a client device with or without a serial port for recording and analyzing patient information.

BRIEF SUMMARY OF THE INVENTION

Data communication systems and related methods and devices for data communication between electronic devices with serial data output and client devices with an audio port.

An embodiment of a data communication system comprises an electronic device, a client device and an interface device. The electronic device includes a serial port, and is configured to obtain serial data and output the serial data via the serial port. The client device includes at least an audio port. The interface device is coupled between the electronic device and the client device and includes a serial port, a signal conversion device and an audio port, wherein the serial port is connected to the serial port of the electronic device and the audio port is connected to the audio port of the client device, wherein the interface device receives first serial data from the electronic device via the serial port, converts the received first serial data to first audio signals via the signal conversion device, and outputs the first audio signals to the client device via the audio port, such that the client device obtains the serial data according to the first audio signals.

In another embodiment, a method for data communication between an electronic device including a serial port and a client device including at least an audio port is provided. The method comprises the following steps. An interface device is first provided to be coupled between the electronic device and the client device and includes a serial port, a signal conversion device and an audio port, wherein the serial port is connected to the serial port of the electronic device and the audio port is connected to the audio port of the client device. The electronic device obtains serial data and outputs the serial data via the serial port. The interface device receives first serial data from the electronic device via the serial port, converts the received first serial data to first audio signals via the signal conversion device, and outputs the first audio signals to the client device via the audio port, such that the client device obtains the serial data according to the first audio signals.

Another embodiment of an interface device which is coupled between an electronic device including a serial port and a client device including at least an audio port for data communication between the electronic device and the client device, comprises a serial port connected to the serial port of the electronic device, an audio port connected to the audio port of the client device and a signal conversion device. The signal conversion device is arranged for performing a serial-to-audio signal conversion for serial data received from the electronic device via the serial port or performing an audio-to-serial signal conversion for audio signals received from the client device via the audio port and outputting the converted data to the client device or the electronic device, respectively.

Methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present disclosure discloses devices and methods for data communication between an electronic device with a serial port and a client device with an audio port, which can take serial data output from the electronic device via the serial port of the electronic device, convert the serial data to audio signal(s) for the client device (such as mobile and handheld devices, including smartphones, tablets and so on), and output the converted audio signal to the client device via the audio port of the client device.

Figure 1:
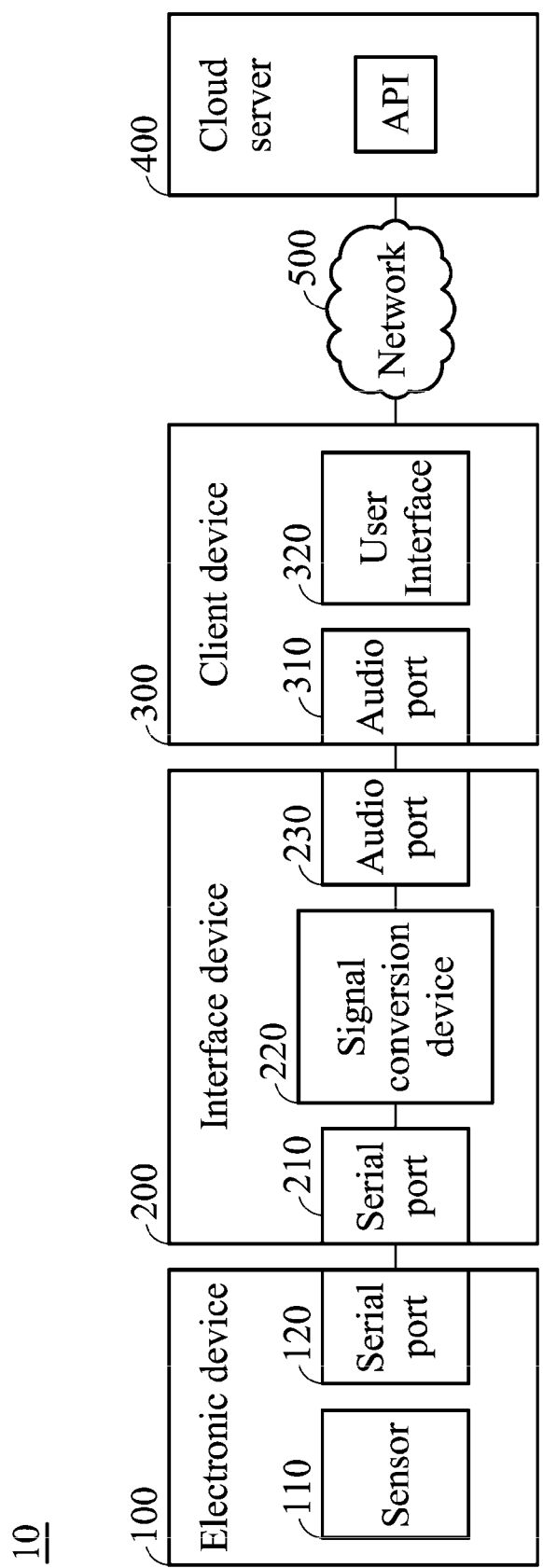
FIG. 1 is a schematic diagram illustrating an embodiment of a data communications system of the invention.

FIG. 1 is a schematic diagram illustrating an embodiment of a data communications system of the invention. As shown in FIG. 1, the data communications system 10 may comprise an electronic device 100 (e.g. a medical device), an interface device 200 (e.g. a cable) and a client device 300 (e.g. a smart phone), wherein the interface device 200 is placed between the electronic device 100 and the client device 300. The electronic device 100 may comprise one or more sensors/detectors 110 and a serial port 120 (e.g. a RS-232 port or UART port), wherein the one or more sensors/detectors 110 can be used for collecting/measuring various sensor data. The interface device 200 may include a serial port/terminal/connector 210, a signal conversion device 220 and an audio port/terminal/connector 230. The client device 300 may include an audio port/terminal/connector 310 and a user interface 320. The interface device 200 (e.g. a cable) can be placed or coupled between the electronic device 100 and the client device 300 for communication with the electronic device 100 and the client device 300. To be more specific, the serial port 210 of the interface device 200 is connected to the serial port 120 of the electronic device 100 to receive the serial data output (e.g. RS-232 serial data) from the electronic device 100 or to transmit a serial data (e.g. RS-232 serial data) to the electronic device 100. The signal conversion device 220 of the interface device 200 is arranged for converting the serial data output from the electronic device 100 to an audio signal compatible with the audio standard used by the audio port 310 of the client device 300 or converting the audio signal received from the audio port 310 of the client device 300 to a serial data (e.g. RS-232 serial data) compatible with the serial data standard used by the serial port 120 of the electronic device 100. The audio port 230 of the interface device 200 is connected to the audio port 310 of the client device 300 to communicate with the client device 300.

The electronic device 100 can be, for example, any electronic device 100 which can collect monitored data or sensor data via its sensor, generate serial data in a serial data form compatible with the serial data form used by the serial port 120 and output the serial data via the serial port 120, such as medical devices and health-related monitoring devices with sensors and detectors to collect/measure medical and health index data such as Blood Glucose level, Blood Pressure, EKG, Cholesterol, Uric Acid and so on. The medical device can be, for example but not limited to, a pulse oximeter, a ventilator, an EKG device, and various other health-related monitoring devices.

In one embodiment, the serial data may be, for example, in the form of a 2.5 mm RS232 jack when the electronic device 100 is a medical device. However, it is understood that the invention is not limited thereto. For example, the serial data may not be limited to being a RS232 serial jack only since serial data jacks can come in many physical forms, such as infrared, USB look-alike, 3.5 mm jack, or other proprietary connectors.

The client device 300 (e.g. the smartphone) may further provide a user interface (e.g. an application) 320 for automatically monitoring data of the audio port 310 of the client device 300 and providing information or further operations corresponding to the monitored data which is detected by the electronic device 100. The client device 300 may receive the audio signals output by the interface device 200 in response to detecting the audio signals from the audio port 310, decode/analyze the audio signal to obtain the serial data and then display the obtained data on a display unit of the client device 300 for users' self-monitoring and checking via the user interface 320, for example.

The user interface 320, such as a software-implemented application (or so-called App), can provide a rich, friendly and informative user experience based on data collection and analysis. For example, the App can display or provide the following information or functionality: provide a logbook, provide periodic summaries during a predefined time period (e.g. 7, 14, 30 day, etc.), identify high and low trends, produce graphs and charts vital data for easy analysis for users or care provider, provide average readings of vital data, provide built-in reminders for users, send real-time alerts to family members or care providers when triggered by pre-defined settings, extract data (e.g., logbook, graphs, or charts) and share the extracted data with family members or care providers periodically or on an as-needed basis, and provide support for multiple users (by creating multiple accounts). In some embodiments, as the interface device 200 can be connected to various medical devices and convert serial data received from the medical devices into audio data to be transmitted to the client device 300, the App is capable of capturing, displaying and providing multiple vital signs (e.g. glucose+blood pressure) with the functionalities described in the section herein.

Figure 2:
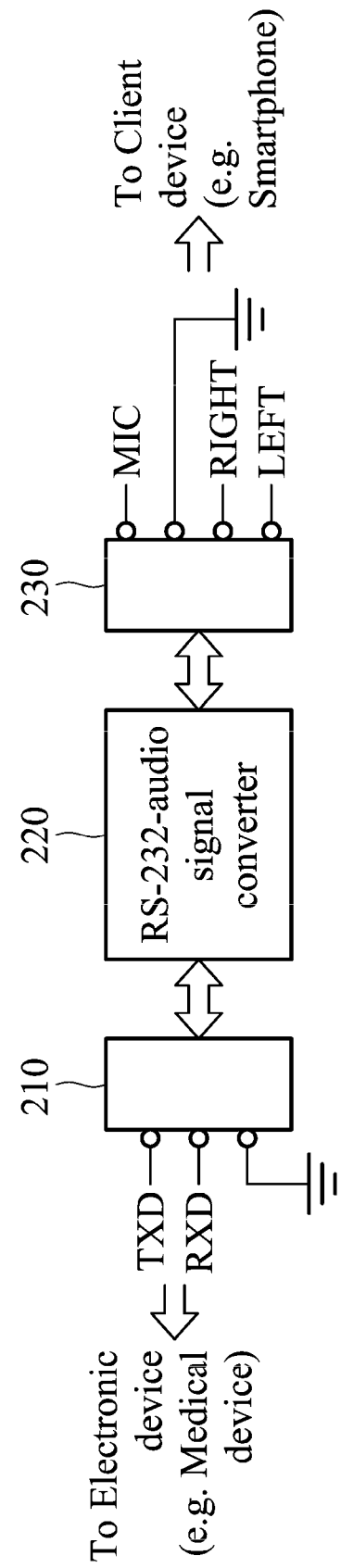
FIG. 2 is a schematic diagram illustrating an embodiment of a more detailed circuit diagram of the interface device in FIG. 1 of the invention.

In some embodiments, methods for data communication between an electronic device including a serial port and a client device including at least an audio port are provided. The method comprises the following steps. An interface device is first provided to be coupled between the electronic device and the client device and includes a serial port, a signal conversion device and an audio port, wherein the serial port is connected to the serial port of the electronic device and the audio port is connected to the audio port of the client device. The signal conversion device is arranged for performing a serial-to-audio signal conversion for serial data received from the electronic device via the serial port or performing an audio-to-serial signal conversion for audio signals received from the client device via the audio port and outputting the converted data to the client device or the electronic device, respectively. A more detailed circuit diagram of the interface device 200 in FIG. 1 is illustrated in FIG. 2 in accordance with an exemplary embodiment of the invention, wherein the serial port 210 is a 3.5 mm RS-232 port, the audio port 230 is a 2.5 mm audio port and the signal conversion device 220 is a RS-232-audio signal converter capable of performing the aforementioned serial-to-audio signal conversion or audio-to-serial signal conversion. In another embodiment, the serial port 210 is a 3.5 mm USB port, the audio port 230 is a 2.5 mm audio port and the signal conversion device 220 is a USB-audio signal converter capable of performing a USB-to-audio signal conversion or audio-to-USB signal conversion.

The responsive method will be discussed further in the following paragraphs.

In one embodiment, the interface device 200 is capable of communicating between an electronic device (e.g. a medical device) and a client device (e.g. a smartphone) by performing a serial-to-audio signal conversion via the signal conversion device. The signal conversion device may perform the serial-to-audio signal conversion by converting first serial data received from the electronic device to first audio signals via the signal conversion device, and output the first audio signals to the client device via the audio port.

Figure 3:
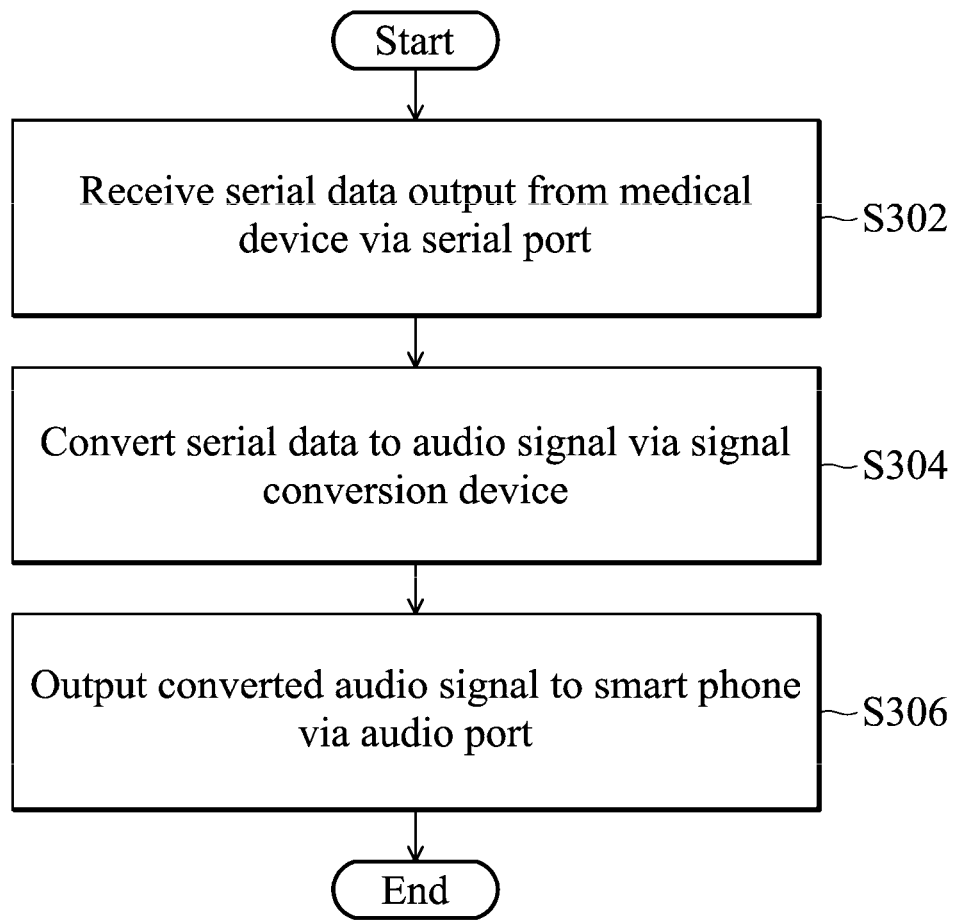
FIG. 3 is a flowchart of an embodiment of a method for data communication between a medical device and a smart phone via a cable of the invention.

FIG. 3 is a flowchart of an embodiment of a method for communication between an electronic device and a client device via an interface device of the invention. Please refer to FIGS. 1 and 2. The method can be applied to the data communication system 10 of FIG. 1. In this embodiment, the electronic device 100 is to be the medical device (e.g. a pulse oximeter, a ventilator or an EKG device), the interface device 200 is to be a cable, and the client device 300 is to be a smart phone, and the invention is not limited thereto. The cable comprises a RS-232 port, a signal conversion device and an audio port, wherein the RS-232 port is connected to the RS-232 port of the medical device and the audio port is connected to the audio port of the smart phone. First, the medical device collects or measures medical and health index data (such as Blood Glucose level or Blood Pressure value) using its sensor, generates RS-232 serial data according to the collected/measured medical and health index data and transmits the RS-232 serial data to the cable via the RS-232 port and the medical device receives the RS-232 serial data output from the medical device via the serial port (step S302). Upon receiving the RS-232 serial data from the medical device via its RS-232 port, the cable converts the RS-232 serial data received to audio signals with a standard format compatible with the standard format used by the audio port of the smart phone via the signal conversion device (step S404) and outputs the converted audio signal to its audio port (step S406). In some embodiments, if the input signal received from the cable is audio signal or data, the signal conversion device bypasses the input signal to the audio port of the smart phone.

The user interface which is provided by the App of the smart phone can be activated and automatically detects and receives the converted audio signal via the audio port of the smart phone, analyzes the converted audio signal to obtain the medical and health index data (e.g. the Glucose value), and utilizes the medical and health index data for performing a particular operation, such as displaying the medical and health index data on the display unit of the smart phone, displaying periodic weekly summaries, providing warning information (e.g. a pop-up warning message, a warning sound and so on) for a user when the medical and health index data is lower or higher than a predetermined value or displaying graphs and charts corresponding to the medical and health index data.

In another embodiment, the interface device 200 is capable of communicating between a medical device and a smart phone by performing an audio-to-serial signal conversion via the signal conversion device. The signal conversion device may perform the audio-to-serial signal conversion by converting second audio signals received from the client device to second serial data.

Figure 4:
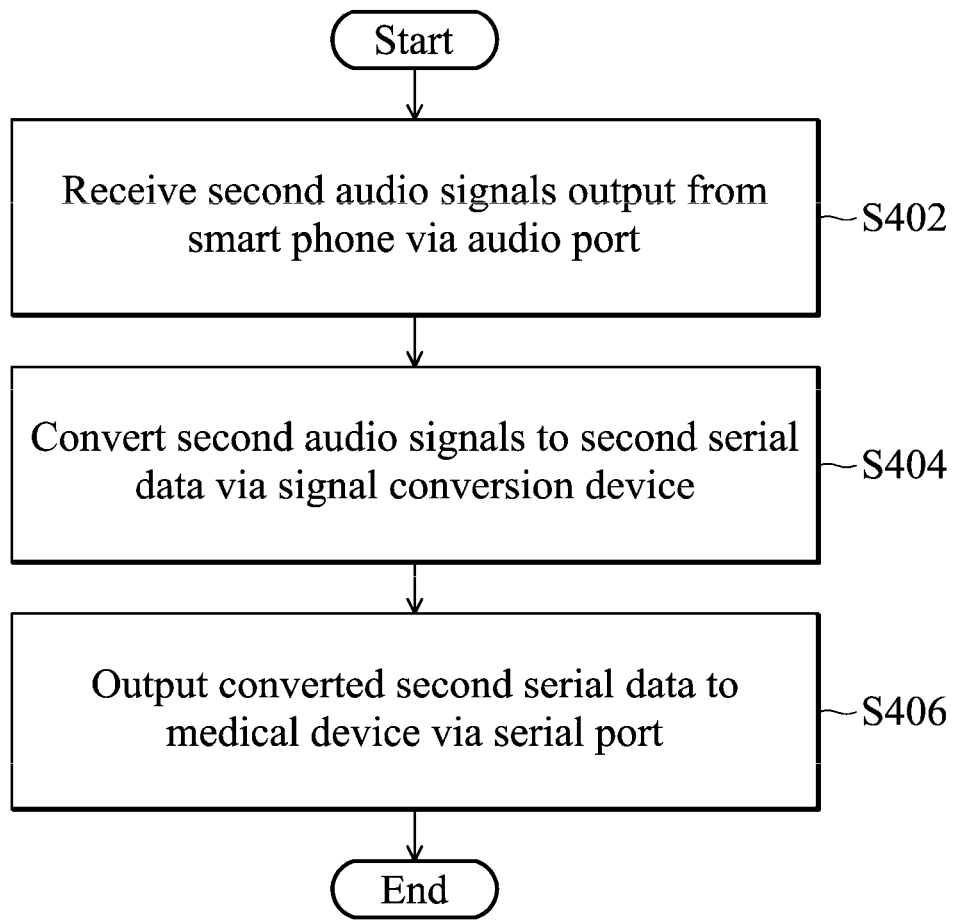
FIG. 4 is a flowchart of another embodiment of a method for data communication between a medical device and a smart phone via a cable of the invention.

FIG. 4 is a flowchart of another embodiment of a method for data communication between an electronic device and a client device via an interface device of the invention. Please refer to FIGS. 1 and 3. The method can be applied to the data communication system 10 of FIG. 1. In this embodiment, the electronic device 100 is to be a medical device, the interface device 200 is to be a cable and the client device 300 is to be a smartphone. The cable comprises a RS-232 port, a signal conversion device and an audio port, wherein the RS-232 port is connected to the RS-232 port of the medical device and the audio port is connected to the audio port of the smart phone. First, the smart phone transmits second audio signals to the cable via the audio port and, upon receiving the second audio signals from the smart phone via its audio port (step S402), the cable converts the received second audio signals to second serial data with a standard format compatible with the standard format used by the serial port of the medical device (e.g. the RS-232 serial data) via the signal conversion device (step S404) and then outputs the converted serial data to the medical device via its serial port (step S406). In some embodiments, if the input signal received from the cable is serial signal or data, the signal conversion device may bypass the input signal to the serial port of the medical device directly.

It should be noted that the audio port 310 of the client device 300 (e.g. the smart phone) typically connects to an audio input/output device (e.g. an earphone or a speaker), and thus the client device 300 of the present disclosure must be able to determine whether the audio signal has been received from the conventional audio input/output device (e.g. the earphone or speaker) or from the interface device 200 (e.g. a cable) of the present disclosure, i.e. whether the audio port of the smart phone is connected to an earphone or a proposed cable, for example.

Therefore, in some embodiments, when a device with an audio port is plugged into the audio port of the client device 300, the client device 300 may further determine whether the plugged device is the interface device 200 (e.g. a cable) of the present disclosure of the invention or an audio input/output device (e.g. the earphone or speaker) according to a determination of whether a predetermined trigger signal has been received from the audio port of the plugged device.

Figure 5:
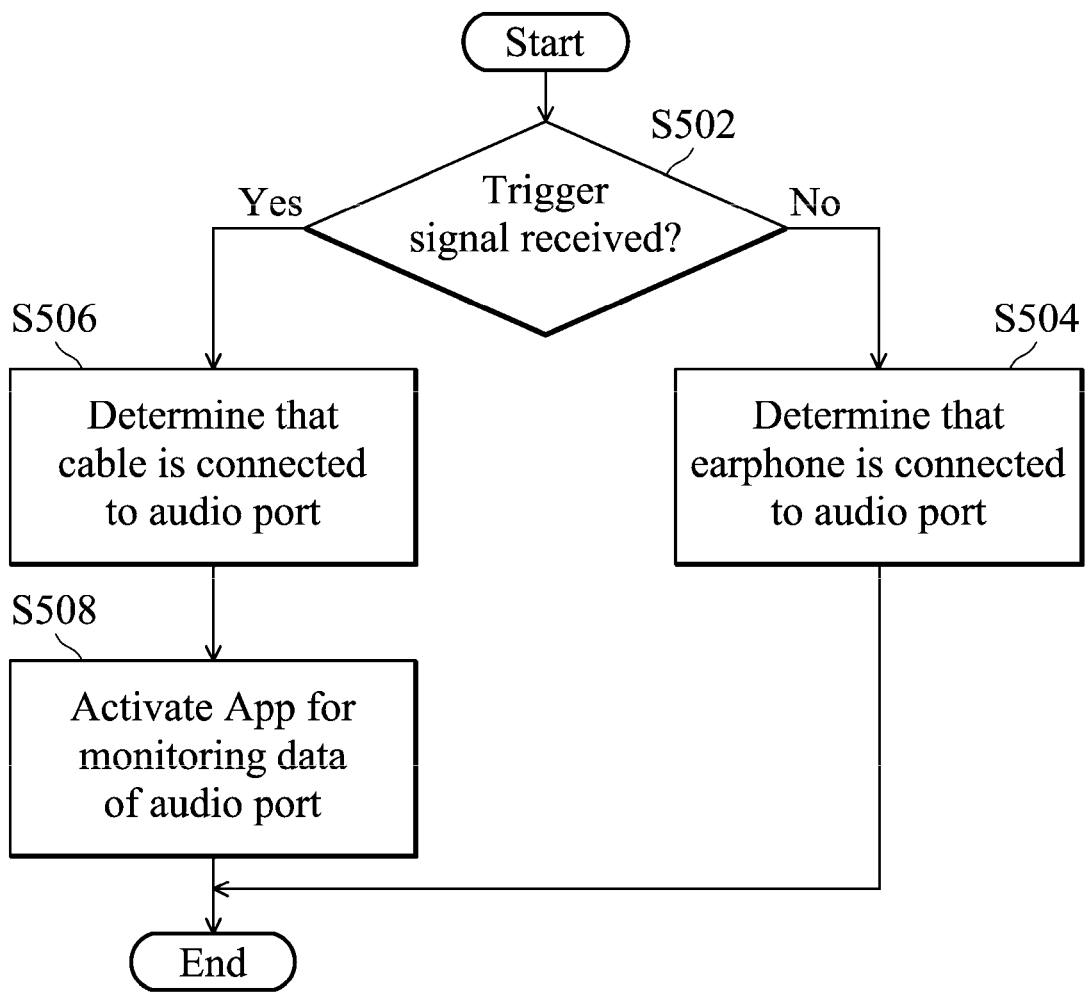
FIG. 5 is a flowchart of a determination method for determining whether the cable or the earphone is connected to the smart phone according to an embodiment of the invention.

FIG. 5 is a flowchart of a determination method for determining whether the cable or the earphone is connected to the client device (e.g. the smartphone) according to an embodiment of the invention.

When it is detected that a device with an audio port is plugged into the audio port of the client device 300, the client device 300 determines whether a predetermined trigger signal has been received from the audio port of the plugged device (S502). When no predetermined trigger signal is received from the audio port of the plugged device (No in step S502), the client device 300 determines that the plugged device is the earphone (step S408) and thus performs normal audio operations. When receiving the predetermined trigger signal from the audio port of the plugged device (Yes in step S502), the client device 300 determines that the plugged device is the cable (step S506).

Taking the interface device 200 being a cable and the electronic device 300 being a smart phone as an example, the cable may further have a specific hardware or software configuration so that it can generate a dedicated trigger signal when it is connected to the audio port of the smart phone (e.g. a specific pin of the audio port of the cable may be always on high and will be changed from high to low when the audio port/terminal of the cable is connected to or plugged into the audio port of the smart phone). Thus, the smart phone may detect whether the dedicated trigger signal has been received and if so, determines that the audio signal has been received from the cable of the present disclosure.

The client device 300 may further activate an application (e.g. the App) to provide a user interface for automatically monitoring data of the audio port 310 of the client device 300 in response to determining that the plugged device is the cable (step S508). For example, in this embodiment, the App of the smart phone may first be deactivated and may later be activated automatically once the dedicated trigger signal is received by the audio port of the smart phone.

In another embodiment, the App can be activated when the client device 300 boots up. Upon detecting that a device is connected to or plugged into the audio port of the client device 300, the client device 300 can transmit a specific signal to the audio port and wait for a responsive reply signal to be received from the audio port. In this case, the interface device 200 (e.g. the cable) can reply with a responsive reply signal to the client device 300 when receiving the specific signal from the audio port so that the App can determine that the device is a cable if the responsive reply signal can be received; otherwise, it determines that the device is an earphone.

In some embodiments, the App may be able to recognize whether or not a proposed cable has been connected to the audio port. For example, in one embodiment, the cable can have a specific ID and the App can determine whether the specific ID is detected when detecting a signal including the specific ID from the audio port. In another embodiment, the App may have an ID list which records all possible IDs of the cables. If the ID retrieved from the received signal is one of the IDs in the ID list, it is determined that the cable is connected to the audio port. In another embodiment, when the cable is connected to the audio port, the App and cable can intelligently determine the brand of the medical device.

Referring back to FIG. 1, the data communications system 10 may further comprise a cloud server 400 and the client device 300 (e.g. the smart phone) may be further coupled to the cloud server 400 via a connected communications network 500 (e.g., any wired/wireless communications networks, such as the INTERNET, 3G, and/or WLAN network and so on) and the client device 300 may further communicate with the cloud server 400 via the connected network 500. The user interface 320 (e.g. the App) may further transmit or upload the obtained data to the cloud server 400 via the connected network 500 for further processing. To be more specific, the client device 300 may further transmit or upload data to the cloud server 400 via the connected network 500 to interact with a third party such that the third party can perform a respective operation based on the transmitted or uploaded data. In some embodiments, the cloud server 400 may provide a set of Application Programming Interfaces (APIs) for enabling communication between the proposed system and third parties. The third parties may be, for example, a server of a care provider or hospital or a display device of a doctor), but it is not limited thereto. The APIs of the cloud server 400 can enable the third parties to connect and to access a platform of the cloud server 400. In some embodiments, third parties can also build services on top of the platform of the cloud server 400. For example, the App can upload the analyzed data received from the audio port to the client device 300, and the cloud server 400 may then store and/or pass the uploaded data to a dedicated third party (e.g. a care provider or hospital's server or a doctor's display device) such that the third party can continually track or monitor user (e.g. a patient) activity and perform subsequent operations accordingly.

In addition, in some exemplary embodiments, the electronic device 100 can be an electronic device other than the medical device, which is capable of providing measurement data via a serial port, such as a GPS device, fitness sensor, a treadmill or running machine or the like. For example, when the electronic device 100 is a GPS device with a GPS sensor (e.g. a GPS receiver), the electronic device 100 can obtain a GPS signal using its GPS sensor (e.g. the GPS receiver), generate an RS-232 serial data according to the GPS signal and output the RS-232 serial data to the cable via the RS-232 port. The cable then receives the RS-232 serial data output from the GPS device via its serial port using RS-232 serial communication, converts the RS-232 serial data received to audio signals with a standard format compatible with the standard format used by the audio port of the client device 300, and outputs the converted audio signal to the client device 300 (e.g. the smart phone). The App of the smart phone automatically detects and receives the converted audio signal via the audio port, analyzes the converted audio signal to obtain the GPS data, and utilizes the GPS data for performing a particular operation, such as displaying the GPS data, performing navigation service using the GPS data and so on.

In sum, the data communication system and related devices and methods for data communication between an electronic device with a serial port and a client device with an audio port of the invention can provide an interface device to convert input signals between serial data and audio signals where an electronic device such as a medical device can communicate with a client device with or without a serial port for recording and analyzing patient information. Moreover, the interface device of the invention can take serial data output from the medical device via the serial port of the medical device, convert the serial data to audio signal(s) for the client device and output the converted audio signal to the client device via the audio port of the client device or vice versa such that a user interface (e.g. an application or a API) provided by the client device can provide a rich, friendly and informative user experience based on data collection and analysis and providing a seamless user experience to user that otherwise would not be possible on an existing medical device. Furthermore, the data communication system and related devices and methods for data communication between an electronic device and a client device of the invention can further connect the client device to a cloud server such that the client device can transmit or upload data to the cloud server via the connected network to interact with third parties to enabling the third parties to continually track or monitor user activity and perform subsequent operations accordingly.

Methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A data communication system, comprising:
an electronic device, including a serial port, wherein the electronic device obtains serial data and outputs the serial data via the serial port;
a client device, including at least an audio port; and
an interface device coupled between the electronic device and the client device and including a serial port, a signal conversion device and an audio port, wherein the serial port is connected to the serial port of the electronic device and the audio port is connected to the audio port of the client device,
wherein the interface device receives first serial data from the electronic device via the serial port, converts the received first serial data to first audio signals via the signal conversion device, and outputs the first audio signals to the client device via the audio port,
such that the client device obtains the serial data according to the first audio signals,
wherein when a device with an audio port is plugged into the audio port of the client device, the client device further determines whether the plugged device is the interface device or an audio input/output device according to a determination of whether a predetermined trigger signal has been received from the audio port of the plugged device, and
wherein the client device further determines that the plugged device is the interface device when the predetermined trigger signal has been received and determines that the plugged device is an audio input/output device when the predetermined trigger signal has not been received.

2. The data communication system of claim 1, wherein the interface device further receives second audio signals from the client device via the audio port, converts the received second audio signals to second serial data via the signal conversion device, and outputs the second serial data to the electronic device via the serial port.

3. The data communication system of claim 1, wherein the electronic device further comprises at least one sensor for providing sensor data and the electronic device further generates the first serial data according to the sensor data.

4. The data communication system of claim 3, wherein the electronic device comprises a medical device and/or a health-related monitoring device with sensors and detectors to collect or measure medical and health index data.

5. The data communication system of claim 1, wherein the interface device is a cable with an audio port and a serial port.

6. The data communication system of claim 1, wherein the client device further determines that the plugged device is the interface device when receiving the predetermined trigger signal from the audio port of the plugged device and determines that the plugged device is the audio input/output device when receiving no predetermined trigger signal from the audio port of the plugged device.

7. The data communication system of claim 1, wherein the client device further activates an application to provide a user interface for automatically monitoring data of the audio port of the client device and providing information or performing further operations corresponding to the monitored data which is detected by the electronic device in response to determining that the plugged device is the interface device.

8. The data communication system of claim 1, wherein the serial port at least comprises one of a RS-232 port and a USB port.

9. The data communication system of claim 1, further comprising a cloud server coupled to the client device via a connected communications network and the client device further transmits or uploads data to the cloud server via the connected network to interact with a third party such that the third party performs a respective operation based on the transmitted or uploaded data.

10. A method for data communication between an electronic device including a serial port and a client device including at least an audio port, comprising:
providing an interface device to be coupled between the electronic device and the client device and includes a serial port, a signal conversion device and an audio port, wherein the serial port is connected to the serial port of the electronic device and the audio port is connected to the audio port of the client device;
the electronic device obtaining serial data and outputting the serial data via the serial port; and
the interface device receiving first serial data from the electronic device via the serial port, converting the received first serial data to first audio signals via the signal conversion device, and outputting the first audio signals to the client device via the audio port,
such that the client device obtains the serial data according to the first audio signals,
wherein when a device with an audio port is plugged into the audio port of the client device, the method further comprises: the client device determining whether the plugged device is the interface device or an audio input/output device according to a determination of whether a predetermined trigger signal has been received from the audio port of the plugged device.

11. The method of claim 10, further comprising:
the interface device further receiving second audio signals from the client device via the audio port, converting the received second audio signals to second serial data via the signal conversion device, and outputting the second serial data to the electronic device via the serial port.

12. The method of claim 10, wherein the interface device is a cable with an audio port and a serial port.

13. The method of claim 10, wherein the client device further determines that the plugged device is the interface device when receiving the predetermined trigger signal from the audio port of the plugged device and determines that the plugged device is the audio input/output device when receiving no predetermined trigger signal from the audio port of the plugged device.

14. The method of claim 10, further comprising:
the client device further activating an application to provide a user interface for automatically monitoring data of the audio port of the client device and providing information or performing further operations corresponding to the monitored data which is detected by the electronic device.

15. The method of claim 14, wherein the application further provides information or performs further operations corresponding to the monitored data by at least one of the following information or operations:
displaying the monitored data on a display unit of the client device;
displaying periodic weekly summaries related to the monitored data during a predefined time period;
identifying high and low trends related to the monitored data;

providing warning information or built-in reminders for a user when the monitored data is lower or higher than a predetermined value;

displaying graphs and charts corresponding to the monitored data.

providing average readings related to the monitored data;

sending real-time alerts to third parties when triggered by pre-defined settings;

extracting the monitored data and sharing the extracted data with third parties; and providing support for multiple users and capturing, displaying and providing multiple vital signs related to the monitored data.

16. The method of claim 10, further comprising providing a cloud server to be coupled to the client device via a connected communications network and the client device further transmits or uploads data to the cloud server via the connected network to interact with a third party such that the third party performs a respective operation based on the transmitted or uploaded data.

* * * * *